Sept. 28, 1965                H. W. BOOK                3,209,240
REGULATING TRANSFORMER SYSTEM
Filed Feb. 16, 1959
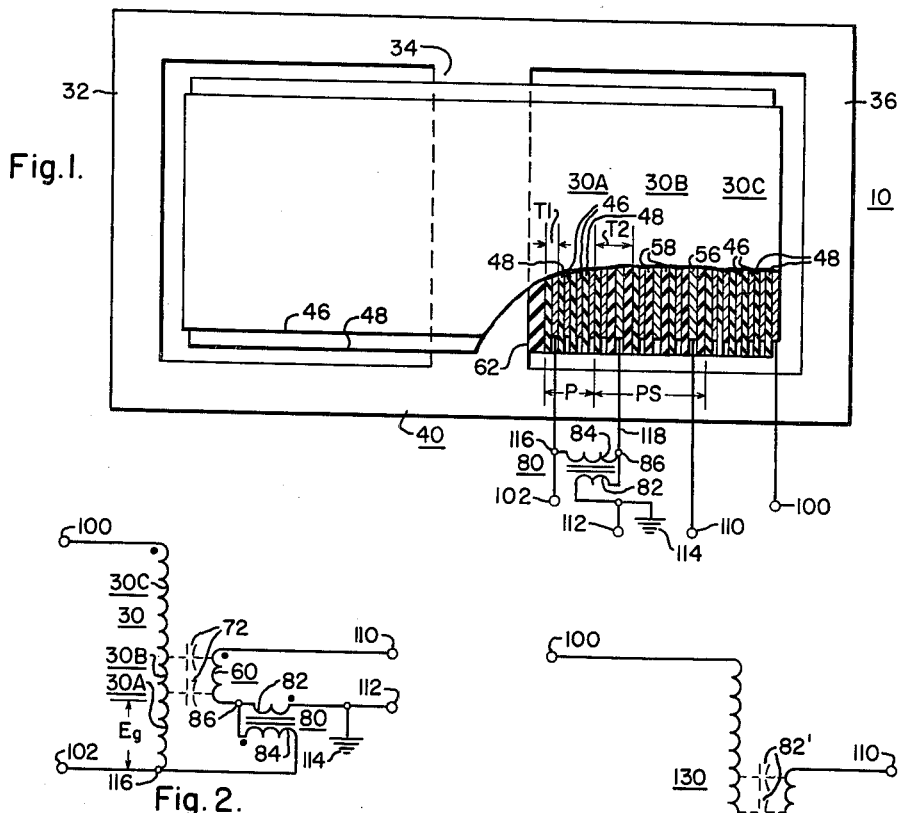
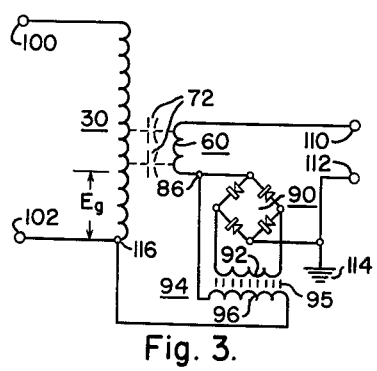
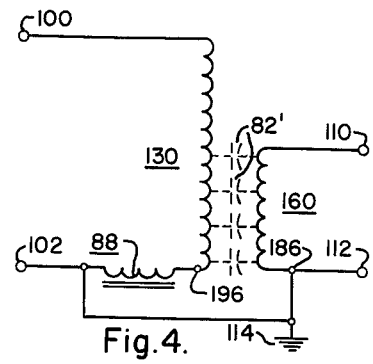
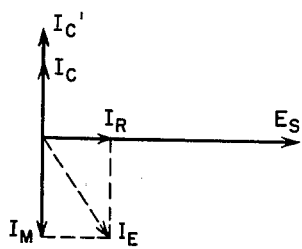
WITNESSES:
Bernard R. Gieguey
Clement L. McHale
INVENTOR
Herbert W. Book
BY
F. E. Browder
ATTORNEY United States Patent Office 3,209,240
Patented Sept. 28, 1965

3,209,240
REGULATING TRANSFORMER SYSTEM
Herbert W. Book, Hickory Township, Mercer County, Pa., assignor to Westinghouse Electric Corporation, East Pittsburgh, Pa., a corporation of Pennsylvania
Filed Feb. 16, 1959, Ser. No. 793,317
26 Claims. (Cl. 323—60)

This invention relates to electrical inductive apparatus such as transformers, and more particularly to the windings of such apparatus.

In copending application Serial No. 745,555, now abandoned, filed by Arthur M. Lockie and assigned to the same assignee as the present application, a new and improved winding for electrical apparatus is disclosed in which capacitance is provided between the windings of electrical inductive apparatus, such as transformers. The winding construction disclosed in said copending application possesses a number of advantages with respect to uniform voltage stress across the insulation between the windings, improved space factor, improved mechanical strength, and improved regulation and efficiency of an electrical distribution system in which said apparatus is incorporated.

The effect of the capacitance provided between the windings of an electrical inductive apparatus, such as a transformer, as disclosed in said copending application, as a reactance is substantially constant or fixed for a particular potential applied to one of said windings, since the voltage applied to said capacitance is essentially independent of the load current being carried by said apparatus. The leading power factor compensation provided by said capacitance therefore can only compensate for a particular value of exciting current or lagging power factor load current being carried by the associated apparatus. There are not corresponding changes in the leading power factor compensation provided by said capacitance as the load current being carried by the associated apparatus varies to provide an essentially self-regulating electrical inductive apparatus. It is therefore desirable to provide an electrical inductive apparatus, such as a transformer, having all of the advantages of the apparatus disclosed in said copending application and in which the voltage applied to the capacitance between the windings of such apparatus or the level of the leading power factor compensation varies with the load current being carried by said apparatus.

It is an object of this invention to provide a new and improved electrical inductive apparatus in which a predetermined capacitance results between the windings of said apparatus.

Another object of this invention is to provide a predetermined capacitance between the windings of an electrical inductive apparatus, such as a transformer, in which the voltage applied to said capacitance during operation varies with the load current being carried by said apparatus.

A further object of this invention is to provide an electrical inductive apparatus, such as a transformer, having an improved regulation characteristic.

Other objects of the invention will, in part, be obvious, and will, in part, appear hereinafter.

For a fuller understanding of the nature and objects of the invention, reference should be had to the following detailed description taken in connection with the accompanying drawings, in which:

FIGURE 1 is a front elevational view, partly in section and partly schematic, of a transformer core and coil assembly illustrating a first embodiment of the invention.

FIG. 2 is an equivalent schematic diagram of the windings of the transformer core and coil assembly shown in FIG. 1.

FIGS. 3 and 4 are equivalent schematic diagrams of the windings of transformer core and coil assemblies illustrating second and third embodiments of the invention, and, FIG. 5 is a vector diagram of some of the voltage and currents associated with the transformer core and coil assemblies shown in FIGS. 1 through 4.

Referring now to the drawing and FIG. 1 in particular, there is shown a transformer core and coil assembly 10 illustrating a first embodiment of the invention. The core and coil assembly 10 includes a first winding 30 and a second winding 60 which are both inductively disposed on a magnetic core 40. The magnetic core 40 includes two windows which are formed by the first and second outer leg members 32 and 36 and a middle or winding leg member 34 on which the windings 30 and 60 are disposed. The winding leg member 34 is enclosed or surrounded by a tube or barrier 62 on which the windings 30 and 60 are wound or supported.

In particular, the first or primary winding 30 comprises first, second and third primary winding portions 30A, 30B and 30C, respectively. Each of said primary winding portions includes a plurality of turns of a first layer of conducting sheet or foil material 46 and a second layer of insulating sheet or film material 48 which are generally spirally wound together around a portion of the magnetic core 40, specifically, the winding leg member 34 in this case. The width of the insulating sheet or strip material 48 is preferably greater than the width of the layer of conducting sheet or strip material 46 in order to provide additional "creep" insulation between the adjacent turns of the primary winding 30. The tube 62 provides mechanical support for the primary winding 30 and may be formed from insulating material in certain applications to insulate the winding 30 from the winding leg member 34 of the magnetic core 40. The conducting sheet material 46 is of a general type in which the axial dimension of said material is relatively large compared to the radial dimension.

In winding the primary winding 30, the first primary winding portion 30A including a predetermined plurality of turns is wound as indicated at P. Each turn of the primary winding portion 30A as indicated at T1 includes only a layer of the conducting sheet material 46 and a layer of the insulating sheet material 48.

After the first primary winding portion 30A has been wound, including a predetermined plurality of turns, the winding of the second or secondary winding 60 is started. The secondary winding 60 comprises a plurality of turns, each of said turns including two layers of the insulating sheet or film material 58 and a layer of conducting sheet or foil material 56 disposed therebetween. After the first primary winding portion 30A of the primary winding 30 has been wound, the three layers of material which comprise the secondary winding 60 are added to the two layers of material which comprise the primary winding 30 and the five layers of said material are then wound simultaneously. In the second primary winding portion 30B of the primary winding 30 with which the turns of the secondary winding 60 are wound simultaneously, each turn of the combined primary and secondary windings as indicated at T2 includes a layer of the insulating material 48 and a layer of the conducting material 46 which comprise the second primary winding portion 30B and two layers of the insulating material 58 and the layer of conducting sheet material 56 which comprise the secondary winding 60. Similarly, the width of the layers of insulating sheet material 58 of the secondary winding 60 is preferably greater than the width of the layer of conducting sheet material 56. It is to be understood that in a particular application, the turns of the secondary winding 60 may each include only one layer of the insulating sheet material 58.

As described, the turns of the secondary winding 60 are wound simultaneously with the turns of the second primary winding portion 30B of the overall primary winding 30 and continuously interleaved with the adjacent turns of the primary winding 30 as indicated at PS for the combined turns of the primary and secondary windings 30 and 60, respectively, for a purpose which will be explained hereinafter. After the combined turns of the primary winding 30 and the secondary winding 60 have been wound, the third or final primary winding portion 30C of the primary winding 30 is wound with a plurality of turns, each of said turns including only the layer of insulating sheet material 48 and the layer of conducting sheet material 46. The turns of the secondary winding 60 therefore start and stop at first and second predetermined turns of the overall primary winding 30.

The connections of the primary winding 30 and the secondary winding 60 will now be described. Referring to FIG. 1 and the equivalent schematic diagram of the windings 30 and 60 of the transformer core and coil assembly 10 shown in FIG. 2, it should be noted that the first, second and third primary winding portions 30A, 30B, and 30C, respectively, of the primary winding 30 are connected in series circuit relationship. The inner end of the conducting sheet material 46 of the first primary winding portion 30A, as indicated at the terminal 116, is connected to the terminal 102. The outer end of the layer of conducting sheet material 46 of the third primary winding portion 30C of the primary winding 30 is connected to the terminal 100. The inner end of the layer of conducting sheet material 56 of the secondary winding 60, as indicated at the terminal 86, is connected to the terminal 112 through the primary winding 82 of a current transformer 80, whose purpose will be discussed hereinafter. The terminal 112 in this case is also connected to a ground connection as indicated at 114. The inner end or turn of the layer of the conducting sheet material 56 of the secondary winding 60 is also connected to the inner end or turn of the conducting sheet material 46 of the overall primary winding 30, as indicated at the terminal 116, through the secondary winding 84 of the current transformer 80. The outer end or turn of the conducting sheet material 56 of the secondary winding 60 is connected to the terminal 110. It is to be understood that in a particular application, a current transformer similar to the current transformer 80 may be provided in which the primary winding is omitted and the output of the secondary winding is responsive to the current flow in the secondary winding 60. In the latter case, the conductor 118 connected between the inner end of said secondary winding and the terminal 86 might function as a primary winding in a through-type current transformer arrangement. It is also to be understood that other methods of interconnecting one point or turn of each of the windings 30 and 60 may be employed in practicing this invention. For example, the inner end of the primary winding 30 could be connected to one end of the secondary winding 84 of the current transformer 80 and the mid-point (not shown) of the secondary winding 60 might be connected to the other end of the secondary winding 84 of said current transformer in a particular application.

The manner in which the primary winding 30 and the secondary winding 60 are constructed or arranged with the adjacent turns of the respective windings being continuously interleaved, has several important results. A first important result is that if a potential is applied to the primary winding 30 between the terminals 100 and 102, the potential will distribute itself substantially uniformly among the turns of the overall primary winding 30. In other words, if a potential V is applied to the primary winding 30 having N number of turns, the potential associated with each turn of the primary winding 30 will be substantially equal to $V/N$. Considering the inner end of the primary winding 30, as indicated at the terminal 116, as a reference point as shown in FIGS. 1 and 2, the voltage associated with each of the turns of the overall primary winding 30 gradually increases with the number of turns between any particular turn of the primary winding 30 and the inner end of said primary winding, as indicated at the terminal 116. For example, if the number of turns included in the first primary winding portion 30A of the primary winding 30 is "$a$," the voltage associated with the turn of the overall primary winding 30 at which the turns of the secondary winding 60 start, as indicated at $E_g$, will be substantially equal at "$a$" times $V/N$. The potential difference therefore between the first turn of the secondary winding 60 at the inner end of said secondary winding and the adjacent turn of the primary winding 30 will be equal to "$a$" times $V/N$, in the absence of a potential across the secondary winding 84 of the current transformer 80, whose operation and purpose will be discussed hereinafter. Since the adjacent turns of the primary winding 30 and the secondary winding 60 are continuously interleaved, and wound together turn for turn, the potential difference or stress between the adjacent turns of said primary winding and said secondary winding will be substantially uniform or at a predetermined value. This is because of the voltage associated with the turns of the overall primary winding 30 increases uniformly in accordance with the number of turns between a particular turn of the primary winding 30 and the inner end or turn of said primary winding. The voltage associated with the turns of the secondary winding 60 increases also at a corresponding rate, the voltage at the starting or innermost turn of the secondary winding 60 being modified by the operation of the current transformer 80. The potential difference or stress therefore, between the adjacent turns of the primary winding 30 and the secondary winding 60 will be substantially uniform.

Referring to FIG. 2, a second important result from the manner in which the windings 30 and 60 are constructed with the adjacent turns of the respective windings being continuously interleaved is that a predetermined capacitance results between the adjacent turns of the windings 30 and 60. The inherent distributed capacitance between the adjacent turns of the primary winding 30 and the secondary winding 60 is indicated at 72. The capacitance 72 varies with several factors. For example, the capacitance 72 varies with the effective area of the layers of conducting material 46 and 56 included in the primary winding 30 and the secondary winding 60, respectively. The capacitance 72 also varies with the dielectric constant and the thickness of the layers of insulating sheet material 48 and 58 included with the primary winding 30 and the secondary winding 60, respectively.

The effect of the capacitance 72 provided between the primary winding 30 and the secondary winding 60, respectively, as a reactance, also varies with the square of the potential of the voltage applied across the insulation between the windings 30 and 60 considered as a dielectric material. The voltage applied to the insulation between the windings 30 and 60 and, in effect, to the capacitance 72 includes two components. Considering the charging path or closed loop formed by the secondary winding 84 of the current transformer 80 which is connected between the inner end of the secondary winding 60 at the terminal 86 and the inner end of the primary winding 30 at the terminal 116, the voltage applied to the capacitance 72 includes a first component $E_g$ which remains substantially constant or at a predetermined value when a particular potential is applied to the primary winding 30 at the terminals 100 and 102. As previously discussed, the first voltage component $E_g$ depends upon the number of turns between the inner end of the primary winding 30 at the terminal 116 and the turn of the primary winding 30 at which the turns of the secondary winding 60 start. The voltage component $E_g$ is substantially independent of any load current which flows in the secondary winding 60 when a potential is applied across the primary winding 30 at the terminals 100 and 102 and a load circuit (not shown) is connected across the secondary winding 60 at the terminals 110 and 112. The second component of the voltage applied to the capacitance 72 depends on the voltage across the secondary winding 84 of the current transformer 80 which, in turn, depends upon or is responsive to the load current flowing in the secondary winding 60 when a load circuit is connected at the terminals 110 and 112.

In summary, the voltage applied to the capacitance 72 includes a substantially constant or fixed component $E_g$ which is independent of the load current flowing in the secondary winding 60 whenever a potential is applied to the terminals 100 and 102, and a second component which is supplied by the output across the secondary winding 84 of the current transformer 80 which varies with the load current flowing in the secondary winding 60. As discussed previously, the turns of the secondary winding 60 are only wound simultaneously with a portion of the turns of the overall primary winding 30. The point at which the turns of the secondary winding 60 are disposed either at the inner end of the primary winding 30 or towards the outer end of said primary winding or intermediate the ends of said primary winding determines the substantially constant voltage component $E_g$ which is applied across the insulation between the adjacent turns of the primary winding 30 and the secondary winding 60, considered as a dielectric. One point or turn of each of the windings 30 and 60 may be interconnected in order to provide a charging path to charge the insulation between the adjacent turns of the windings 30 and 60, considered as a dielectric, when a potential is applied across the primary winding 30 and a potential difference exists between the adjacent turns of said windings. The output voltage across the secondary winding 84 of the current transformer 80 is preferably arranged to add to or boost the voltage component $E_g$ and to increase the total voltage applied to the capacitance 72 as the load current which flows in the secondary winding 60 increases. It is to be noted that under no-load conditions or when the current flow in the secondary winding 60 is negligible, the total voltage applied to the capacitance 72 is substantially equal to the voltage component $E_g$. In general, the current transformer 80 and the interconnections of said current transformer with the windings 30 and 60 comprise means for varying the voltage applied to the capacitance 72 with the load current flowing in the secondary winding 60. It is to be understood that in certain applications the turns of the primary winding 30 and the secondary winding 60 may be arranged with the starting turns of each of said windings adjacent to each other or the winding of said turns starting together. The latter arrangement of said windings would reduce the voltage component $E_g$ to a negligible value. In the latter application, the voltages applied to the capacitance 72 would be negligible under no-load conditions and the voltage across said capacitance would depend substantially entirely on the output across the secondary winding 84 of the transformer 80 and vary in accordance with the load current flowing in the secondary winding 60.

Referring to the vector diagram of FIG. 5, the manner in which the capacitance 72 provided between the primary winding 30 and the secondary winding 60 affects the operation of the core and coil assembly 10, shown in FIG. 1, is illustrated. The vector $E_S$ represents the applied potential across the primary winding 30 between the terminals 100 and 102. The vector $I_E$ represents the normal lagging power factor exciting current that would flow in the core and coil assembly 10 in the absence of the capacitance provided between the primary winding 30 and the secondary winding 60. The vectors $I_R$ and $I_M$ represent the core loss component and the magnetizing component, respectively, of the exciting current $I_E$. The vector $I_C$ represents the leading power factor current drawn by the effective capacitance between the windings 30 and 60 when the potential $E_S$ is applied to the primary winding 30 and substantially no load current is flowing in the secondary winding 60. The vector $I_C'$ represents the leading power factor current drawn by the effective capacitance between the windings 30 and 60 when the potential $E_S$ is applied to the primary winding 30 and a predetermined load current is flowing in the secondary winding 60 to a load circuit (not shown) connected at the terminals 110 and 112. It is to be noted that the current $I_C$ represents a minimum value of current drawn by the capacitance 72 between the windings 30 and 60 for a particular potential applied at the terminals 100 and 102 and is independent of any load current flowing in the secondary winding 60.

The magnetizing component $I_M$ of the exciting current $I_E$ lags the applied potential $E_S$ by 90 degrees. The core loss component $I_R$ of the exciting current $I_E$ is in phase with the applied voltage $E_S$. The leading power factor currents $I_C$ and $I_C'$ drawn by the capacitance 72 between the windings 30 and 60 under substantially no-load and predetermined load current conditions, respectively, leads the applied potential $E_S$ by an angle of substantially 90 degrees. Since the magnetizing component $I_M$ of the exciting current $I_E$ and the leading power factor currents $I_C$ and $I_C'$ drawn by the capacitance 72 between the windings 30 and 60, are substantially 180 degrees out of phase, the core and coil assembly 10 may be designed so that the leading power factor current $I_C$ under no-load conditions substantially cancels the magnetizing component $I_M$ of the exciting current $I_E$, or the capacitance provided and the voltage applied to said capacitance under no-load conditions may be such as to draw a leading power factor current $I_C$ which is even larger than the magnetizing component $I_M$ of the exciting current $I_E$. When load current starts to flow in the secondary winding 60, the voltage applied to the capacitance 72 shown in FIG. 2 will increase because of the voltage across the secondary winding 84 of the current transformer 80 and the leading power factor current drawn by the capacitance 72 may be arranged to increase to a value as indicated by the vector $I_C'$, as shown in FIG. 5, for a particular or predetermined load current flowing in the secondary winding 60. In other words, the effect of the capacitance 72 as a reactance is modified by the operation of the current transformer 80 so that the leading power factor compensation which results from the operation of the capacitance 72 varies with the load current flowing in the secondary winding 60, similarly to the operation of a separate series capacitor which is often employed in conventional electrical distribution systems to provide leading power factor compensation and to improve voltage regulation. The compensation provided in an apparatus as disclosed, therefore, is effectively stepless or continuously varying with load current to compensate for the voltage drop or the regulation of the core and coil assembly 10 as shown in FIG. 1, and in certain applications, for the voltage drop in an associated feeder line which may be connected between the transformer core and coil assembly 10 at the terminals 110 and 112 and a load circuit (not shown) supplied by said assembly.

Referring to FIG. 3, there is illustrated a second embodiment of the invention, in which the means for varying the voltage applied to the capacitance 72 with the current flowing in the secondary winding 60 comprises a saturable reactor 94 and a rectifier means 90 instead of the current transformer 80 employed in the first embodiment of the invention shown in FIGS. 1 and 2.

In particular, the rectifier 90 is of the full wave bridge type, and the input or alternating current terminals of said rectifier are connected between the inner end of the secondary winding 60 at the terminal 86 and the terminal 112 which is also connected to the ground connection 114. The saturable reactor 94 includes a control winding 92 which is connected across the output or unidirectional terminals of the rectifier 90 and an output or load winding 96 which is connected between the inner end of the secondary winding 60 at the terminal 86 and the inner end of the primary winding 30 at the terminal 116, said windings being both inductively disposed on a magnetic core 95. The current flow in the control winding 92 of the saturable reactor 94 therefore varies with the load current flowing in the secondary winding 60 when a load circuit (not shown) is connected at the terminals 110 and 112. The effective impedance of the saturable reactor 94 and the current flow in the load winding 96, as well as the voltage drop across said load winding, depends or varies with the current flow through the control winding 92. The voltage drop across and the impedance of the saturable reactor 94 between the terminals 86 and 116 varies, therefore, with the load current flow through the secondary winding 60.

Considering the effect of the operation of the saturable reactor 94 and the rectifier 90 on the voltage applied to the capacitance 72 shown in FIG. 3, the net voltage applied to said capacitance will be the difference between the voltage component $E_g$ and the voltage drop across the saturable reactor 94, considered as an impedance, since the load winding 96 of the saturable reactor 94 completes the charging path for the capacitance 72. Under no-load conditions or when the load current flowing in the secondary winding 60 is negligible, the impedance of the saturable reactor 94 and the voltage drop across said reactor are at their respective maximum values. As the load current in the secondary winding 60 increases, the effective impedance of the saturable reactor 94 and the associated voltage drop across said reactor both decrease to a minimum value when the magnetic core 95 of said reactor becomes saturated. When the core 95 of the reactor 94 becomes saturated, the voltage drop across said reactor is at its minimum value and the voltage applied to the capacitance 72 is at its maximum value. It is to be noted that the maximum voltage which can be applied to the capacitance 72 in the embodiment shown in FIG. 3 is determined by the voltage component $E_g$ which, in turn, depends upon the amount of delay in starting the turns of the secondary winding 60. The vector diagram shown in FIG. 5 is similarly applicable to the second embodiment of the invention shown in FIG. 3 with the vectors $I_C$ and $I_C'$ representing the current drawn by the capacitors 72 under no-load conditions and for a predetermined load current flowing in the secondary winding 60 or for a saturated condition of the core 95 of the reactor 94, respectively. The construction of the windings 30 and 60 and the balance of the connections of said windings would be otherwise similar to the first embodiment of the invention shown in FIGS. 1 and 2.

It is to be noted that the first and second embodiments of the invention, shown schematically in FIGS. 2 and 3, respectively, each has an advantage in limiting the voltage applied to the capacitance 72 during an overload condition of the core and coil assembly 10 when the load current flowing through the secondary winding 60 is excessive. This is because the component of the voltage applied to the capacitance 72 which varies with the current flowing in the secondary winding 60 tends to be limited by the saturation of the magnetic cores included with the current transformer 80 and the saturable reactor 94, respectively.

Referring to FIG. 4, there is shown a third embodiment of the invention in which the means for varying the voltage applied to the capacitance between two windings of an apparatus of the type disclosed, with the load current flowing in one of said windings comprises an inductive reactance instead of a current transformer as employed in the first embodiment of the invention.

In particular, the primary winding 130 is constructed similarly to the primary winding 30 shown in FIGS. 1 and 2. The secondary winding 160 is constructed similarly to the secondary winding 60 shown in FIGS. 1 and 2, except that the winding of the turns at the inner ends or turns of the primary winding 130 and the secondary winding 160 is started simultaneously. The inner ends or turns of the primary winding 130 and the secondary winding 160 are, therefore, preferably disposed adjacent to each other as indicated at the terminals 196 and 186, respectively. The predetermined capacitance between the continuously interleaved turns of the windings 130 and 160 is indicated at 82'. Otherwise, the construction of the windings 130 and 160 is similar to the construction of the windings 30 and 60, respectively, shown in FIG. 1.

The inner or lower end of the primary winding 130, as indicated at 196, is connected to the terminal 102 through the inductive reactance or reactor 88. The outer or upper end or turn of the primary winding 130 is connected to the terminal 100. The inner end of the secondary winding 160, as indicated at 186, is connected to the terminal 112 as well as to the ground connection 114. The terminal 102 is also connected to the ground connection 114. The outer end or turn of the secondary winding 160 is connected to the terminal 110.

The operation of the third embodiment of the invention shown in FIG. 4 will now be considered. Since, in a preferred construction, the inner turns of the windings 130 and 160 are disposed adjacent to each other, the voltage component $E_g$, which would otherwise be present, is negligible and the voltage applied to the capacitance 82' depends substantially entirely upon the voltage drop across the inductive reactance 88 which is connected in the closed loop or charging path of the capacitance 82'. When a potential is applied across the primary winding 130 at the terminals 100 and 102 and no load current is flowing to a load circuit (not shown) which would be connected across the secondary winding 160 at the terminals 110 and 112, the voltage drop applied to the capacitance 82' depends on the voltage drop across the reactance 88 due to the no-load exciting current flowing in the primary winding 130. When a load circuit is connected at the terminals 110 and 112 and load current flowing in the secondary winding 160 causes a corresponding increase in the current flowing in the primary winding 130, the voltage drop across the reactance 88 will also increase or vary with the load current flowing in the secondary winding 160. The maximum voltage drop across the reactance 88 and the corresponding maximum voltage applied to the capacitance 82' will therefore depend upon the maximum load current flowing in the secondary winding 160 and the maximum corresponding current flowing in the primary winding 130. The third embodiment of the invention shown in FIG. 4 has the additional advantage that the terminals 102 and 112 may be both connected to a ground connection as indicated at 114 without affecting the operation of the windings 130 and 160 and the distributed capacitance 82' between said windings. The vector diagram shown in FIG. 5 may also be considered applicable to the third embodiment of the invention shown in FIG. 4 with the leading power factor currents $I_C$ and $I_C'$ drawn by capacitance 82' corresponding to the no-load condition and to a predetermined load condition of current flow in the windings 130 and 160 respectively.

It is to be understood that the windings 130 and 160 may be provided in certain applications with a delay in the start of the winding of the turns of the secondary winding 160 to apply an additional no-load voltage component to the capacitance 82'. Similarly to the first and second embodiments of the invention shown in FIGS. 2 and 3, respectively, the third embodiment of the invention shown in FIG. 4 may also be arranged so that under no-load conditions the leading power factor compensation provided by the capacitance 82' and the inductive reactance 88 in cooperation substantially compensates for the otherwise lagging power factor magnetizing component of the exciting current drawn by a core and coil assembly including the windings 130 and 160.

A fourth possible embodiment of the invention would be to vary the voltage applied to the capacitance 72 shown in FIGS. 1 and 2 by substituting a non-linear impedance or device such as a thermistor, for the current transformer 80. The non-linear impedance would be connected between the terminals 86 and 116 and the terminal 86 would be directly connected to the terminal 112 and the ground connection 114. The latter impedance would therefore be connected in the charging path of the capacitance 72.

In operation, a non-linear impedance, such as a thermistor, would be arranged to add a voltage component to $E_g$, similarly to the current transformer 80, which would vary with the load current being carried by the secondary winding 60. The impedance of such a non-linear impedance or device could be arranged to vary with the load current since the impedance of said device, such as a thermistor, would vary with the temperature of a liquid dielectric, such as insulating oil, whose temperature varies, in turn, with the load current being carried by an apparatus, such as the core and coil assembly 10.

In summary, an electrical inductive apparatus, such as a transformer, as disclosed would include a predetermined capacitance between the windings of said apparatus. The effect of said capacitance as a reactance, which varies as the square of the voltage applied to said capacitance, would vary with the load current being carried by said apparatus and would vary in a continuous, stepless manner. The leading power factor compensation resulting from the operation of said capacitance and the voltage applied to said capacitance can be arranged to compensate for the voltage drop or regulation of the apparatus itself, as well as for voltage drop or a portion of the voltage drop in an associated feeder line connected between said apparatus and a load or load circuit in order to provide essentially regulation-free operation in an electrical distribution system. The effect of the capacitance on the windings of the apparatus as disclosed will therefore be similar to the effect of a separate series capacitance which is often employed in conventional distribution systems to improve regulation and compensate for lagging power factor load currents drawn by load circuits or for lagging power factor exciting currents drawn by electrical inductive apparatus, such as transformers, to improve the overall efficiency of an electrical distribution system.

It is to be understood that other forms of electrical inductive apparatus incorporating the teachings of the invention may be provided with different arrangements of the insulation between the turns of the respective windings. For example, instead of using separate layers of sheet or film insulation between the turns of the primary winding 30 or the secondary windings shown in FIG. 1, the layers of conducting sheet material 46 or 56, respectively, may be coated with an insulating material, such as enamel, on at least one side and the edges of the turns could be coated by other suitable insulating material, such as resins, to provide insulation between the turns of said winding and between said winding and the core structure or ground. In addition, while the windings as disclosed inherently have excellent heat dissipation characteristics, it may be advisable or necessary in larger ratings to incorporate or wind in conventional duct formers to provide additional cooling. Since there is no potential difference along the vertical axis of the turns of the winding, the latter duct formers could be formed from material having a high thermal conductivity, such as a metal bar. It is contemplated that the conducting sheet or strip material from which the windings as disclosed would preferably be formed would be a suitable metallic material such as sheet copper or aluminum. Although the invention is illustrated with apparatus including a magnetic core, said core may be omitted in certain applications and the windings wound about an axis. It is also to be understood that other modifications of the invention, such as those disclosed in the previously mentioned copending application, could be incorporated in apparatus embodying the teachings of this invention.

The apparatus embodying the teachings of this invention has all of the advantages disclosed in said copending application with respect to leading power factor compensation, improved space factor, improved mechanical strength, uniform voltage stressing of the insulation between the winding, more efficient utilization of said insulation, and also has several additional advantages. A first additional advantage is that the voltage applied to the capacitance between the windings varies with the load current being carried by the associated apparatus and varies in a continuous stepless manner. A second additional advantage is that the means employed to vary the voltage across the capacitance between windings with load current is completely static, as disclosed for the different embodiments of the invention, rather than including moving parts or tap changing equipment, as commonly provided in conventional apparatus of the same general type.

Since numerous changes may be made in the above described apparatus and circuits, and different embodiments of the invention may be made without departing from the spirit and scope thereof, it is intended that all the matter contained in the foregoing description or shown in the accompanying drawings shall be interpreted as illustrative, and not in a limiting sense.

I claim as my invention:

1. An electrical apparatus having input terminals for connection to a source of potential and output terminals for connection to a load circuit comprising a magnetic core, a first winding including a plurality of turns of a layer of conducting sheet material, said first winding being connected to at least one of said input terminals, a second winding including a plurality of turns of a layer of conducting sheet material, said second winding being connected to said output terminals, the turns of said second winding being wound with and continuously interleaved with and electrically insulated from a portion of the turns of said first winding to provide a predetermined capacitance between said first and second windings, and means responsive to current flow to said load circuit connected in circuit relation between one turn of the conducting sheet material of said first winding and one turn of the conducting sheet material of said second winding for varying the voltage applied to said capacitance with said current flow to said load circuit.

2. An electrical apparatus having input terminals for connection to a source of potential and output terminals for connection to a load circuit comprising a magnetic core, a first winding including a plurality of turns of a layer of conducting sheet material, said first winding being connected to said input terminals, a second winding including a plurality of turns of a layer of conducting sheet material, said second winding being connected to said output terminals, the turns of said second winding being wound with and continuously interleaved with and electrically insulated from a portion of the turns of said first winding to provide a predetermined capacitance between said first and second windings, and means responsive to current flow from said second winding to said load circuit connected in circuit relation between one turn of the conducting sheet material of each of said first and second windings for varying the voltage applied to said capacitance with said current flow to said load circuit, said means comprising a current transformer having an output winding to provide a voltage which varies with said current flow.

3. An electrical apparatus having input terminals for connection to a source of potential and output terminals for connection to a load circuit comprising a magnetic core, a first winding including a plurality of turns of a layer of conducting sheet material, said first winding being connected to said input terminals, a second winding including a plurality of turns of a layer of conducting sheet material, said second winding being connected to said output terminals, the turns of said second winding being wound with and continuously interleaved with and electrically insulated from a portion of the turns of said first winding to provide a predetermined capacitance between said first and second windings, and means responsive to current flow to said load circuit connected in circuit relation between one turn of the conducting sheet material of each of said first and second windings for varying the voltage applied to said capacitance with said current flow to said load circuit, said means comprising a saturable reactor and a rectifier.

4. An electrical apparatus having input terminals for connection to a source of potential and output terminals for connection to a load circuit comprising, a magnetic core, a first winding including a plurality of turns of a layer of conducting sheet material, said first winding being connected to said input terminals, a second winding including a plurality of turns of a layer of conducting sheet material, said second winding being connected to said output terminals, the turns of said second winding being wound with and continuously interleaved with and electrically insulated from a portion of the turns of said first winding to provide a predetermined capacitance between said first and second windings, and means responsive to current flow from said second winding to said load circuit connected in circuit relation between one turn of the conducting sheet material of each of said first and second windings for varying the voltage applied to said capacitance with said current flow to said load circuit, said means comprising a reactance.

5. An electrical apparatus having input terminals for connection to a source of potential and output terminals for connection to a load circuit comprising, a magnetic core, a first winding including a plurality of turns of a layer of conducting sheet material and a layer of insulating sheet material wound together on said core, said first winding being connected to said input terminals, a second winding including a plurality of turns of a layer of conducting sheet material and at least one layer of insulating sheet material, said second winding being connected to said output terminals, the turns of said second winding being wound with and continuously interleaved with a portion of the turns of said first winding to provide a predetermined capacitance between said first and second windings, and means responsive to current flow from said second winding to said load circuit connected in circuit relation between one turn of the conducting sheet material of each of said first and second windings for varying the voltage applied to said capacitance with said current flow to said load circuit, said means comprising a saturable reactor and a rectifier, said rectifier being connected in series with one of said windings, said saturable reactor having a load winding connected between the end turns of said first and second windings and a control winding connected across the output of said rectifier.

6. An electrical apparatus having input terminals for connection to a source of potential and output terminals for connection to a load circuit comprising, a magnetic core, a first winding including a plurality of turns of a layer of conducting sheet material and a layer of insulating sheet material wound together on said core, said first winding being connected to said input terminals, a second winding including a plurality of turns of a layer of conducting sheet material and at least one layer of insulating sheet material, said second winding being connected to said output terminals, the turns of said second winding being wound with and continuously interleaved with a portion of the turns of said first winding to provide a predetermined capacitance between said first and second windings, and means responsive to current flow from said second winding to said load circuit when said source of potential is applied to said input terminals, said means being connected in circuit relation between one turn of the conducting sheet material of each of said first and second windings for varying the voltage applied to said capacitance with said current flow to said load circuit, said means comprising a current transformer, said current transformer having an input winding connected in series with said second winding and an output winding connected between adjacent end turns of said first and second windings to provide a charging path between said first and second windings.

7. An electrical apparatus having input terminals for connection to a source of potential and output terminals for connection to a load circuit comprising, a magnetic core, a first winding including a plurality of turns of a layer of conducting sheet material and a layer of insulating sheet material wound together on said core, said first winding being connected to said input terminals, a second winding including a plurality of turns of a layer of conducting sheet material and at least one layer of insulating sheet material, said second winding being connected to said output terminals, the turns of said second winding being wound with and continuously interleaved with a portion of the turns of said first winding to provide a predetermined capacitance between said first and second windings, and means responsive to current flow from said second winding to said load circuit when said source of potential is applied to said input terminals, said means being connected in circuit relation between one turn of the conducting sheet material of each of said first and second windings for varying the voltage applied to said capacitance with said current flow to said load circuit, said means comprising an inductive reactance.

8. A transformer comprising a magnetic core, a first winding including a plurality of turns of a layer of conducting sheet material and a layer of insulating sheet material generally spirally wound together on said core, a second winding including a plurality of turns of a layer of conducting sheet material and at least one layer of insulating sheet material, the turns of said second winding being wound with and continuously interleaved with a portion of the turns of said first winding to provide a predetermined capacitance between said first and second windings, and means responsive to the current in one of said windings when a potential is applied to the other of said windings for varying the voltage applied to said capacitance with said current, said means being connected in series circuit relation between one turn of the conducting sheet material of said first winding and one turn of the conducting sheet material of said second winding to provide a voltage which varies with said current.

9. In a transformer, the combination comprising, a magnetic core, a first winding including a plurality of turns of a layer of conducting sheet material and a layer of insulating sheet material generally spirally wound together on said core, a second winding including a plurality of turns of a layer of conducting sheet material and at least one layer of insulating sheet material, the turns of said second winding being wound with and continuously interleaved with a portion of the turns of said first winding to provide a predetermined capacitance between said first and second windings, and means responsive to the current in one of said windings when a potential is applied to the other of said windings for varying the voltage applied to said capacitance with said current, said means being connected between one point of each of said windings, said means comprising a current transformer having a primary winding connected in series with said second winding and a secondary winding connected between one turn of the conducting sheet material of said first winding and one turn of the conducting sheet material of said second winding.

10. In a transformer, the combination comprising, a magnetic core, a first winding including a plurality of turns of a layer of conducting sheet material and a layer of insulating sheet material generally spirally wound together on said core, a second winding including a plurality of turns of a layer of conducting sheet material and at least one layer of insulating sheet material, the turns of said second winding being wound with and continuously interleaved with a portion of the turns of said first winding to provide a predetermined capacitance between said first and second windings, and means responsive to the current in one of said windings when a potential is applied to the other of said windings for varying the voltage applied to said capacitance with said current, said means being connected in series circuit relation between one point of each of said first and second windings, said means comprising a saturable reactor and a rectifier.

11. In a transformer, the combination comprising, a magnetic core, a first winding including a plurality of turns of a layer of conducting sheet material and a layer of insulating sheet material generally spirally wound together on said core, a second winding including a plurality of turns of a layer of conducting sheet material and at least one layer of insulating sheet material, the turns of said second winding being wound with and continuously interleaved with a portion of the turns of said first winding to provide a predetermined capacitance between said first and second windings, and means responsive to the current in one of said windings when a potential is applied to the other of said windings for varying the voltage applied to said capacitance with said current, said means being connected in series circuit relation between one point of each of said first and second windings, said means comprising a reactance.

12. In a transformer, the combination comprising, a magnetic core, a first winding including a plurality of turns of a layer of conducting sheet material and a layer of insulating sheet material generally spirally wound together on said core, a second winding including a plurality of turns of a layer of conducting sheet material and at least one layer of insulating sheet material, the turns of said second winding being wound with and continuously interleaved with a portion of the turns of said first winding to provide a predetermined capacitance between said first and second windings, and means responsive to the current in one of said windings when a potential is applied to the other of said windings for varying the voltage applied to said capacitance with said current, said means being connected between one point of each of said windings, said means comprising a saturable reactor and a rectifier, said rectifier being connected in series with one of said windings, said saturable reactor having a load winding connected between the end turns of said windings and a control winding connected across the output of said rectifier.

13. A transformer comprising, a magnetic core, a first winding including a plurality of turns of a layer of conducting sheet material and a layer of insulating sheet material generally spirally wound together on said core, a second winding including a plurality of turns of a layer of conducting sheet material and at least one layer of insulating sheet material, the turns of said second winding being wound with and continuously interleaved with a portion of the turns of said first winding to provide a predetermined capacitance between said first and second windings, and current sensing means responsive to the current in one of said windings when a potential is applied to either of said windings for varying the voltage applied to said capacitance with said current, said means being connected in series circuit relation between one point of each of said first and second windings, said means comprising a current transformer, said current transformer having an output winding connected between adjacent end turns of said first and second windings.

14. In a transformer, the combination comprising, a magnetic core, a first winding including a plurality of turns of a layer of conducting sheet material and a layer of insulating sheet material generally spirally wound together on said core, a second winding including a plurality of turns of a layer of conducting sheet material and at least one layer of insulating sheet material, the turns of said second winding being wound with and continuously interleaved with a portion of the turns of said first winding to provide a predetermined capacitance beween said first and second windings, and means responsive to the current in one of said windings when a potential is applied to the other of said windings for varying the voltage applied to said capacitance with said current, said means being connected in circuit relation between one point of each of said windings, said means comprising an inductive reactance.

15. A transformer comprising a magnetic core, a first winding comprising a plurality of turns of conducting sheet material having a coating of insulation on at least one side generally spirally wound on said core, a second winding comprising a plurality of turns of conducting sheet material having a coating of insulation on at least one side, the turns of said second winding being wound with and continuously interleaved with a portion of the turns of said first winding to provide a predetermined capacitance between said first and second windings, and means responsive to the current in one of said windings when a potential is applied to one of said windings for varying the voltage applied to said capacitance with said current, said means being connected in circuit relation between one turn of the conducting sheet material of said first winding and one turn of the conducting sheet material of said second winding to provide a charging path between said first and second windings.

16. A transformer comprising, a magnetic core, a first winding comprising a plurality of turns of conducting sheet material having a coating of insulation on at least one side and being generally spirally wound on said core, a second winding comprising a plurality of turns of conducting sheet material having a coating of insulation on at least one side, the turns of said second winding being wound with and continuously interleaved with a portion of the turns of said first winding to provide a predetermined capacitance between said first and second windings, and means responsive to the current in one of said windings when a potential is applied to one of said windings for varying the voltage applied to said capacitance with said current, said means being connected in circuit relation between one turn of the conducting sheet material of said first winding and one turn of the conducting sheet material of said second winding, said means comprising a current transformer having an output winding to provide a voltage which varies with said current.

17. In a transformer, the combination comprising, a magnetic core, a first winding comprising a plurality of turns of conducting sheet material having a coating of insulation on at least one side generally spirally wound on said core, a second winding comprising a plurality of turns of conducting sheet material having a coating of insulation on at least one side, the turns of said second winding being wound with and continuously interleaved with a portion of the turns of said first winding to provide a predetermined capacitance between said first and second windings, and means responsive to the current in one of said windings when a potential is applied to one of said windings for varying the voltage applied to said capacitance with said current, said means being connected in circuit relation between one turn of the conducting sheet material of each of said first and second windings, said means comprising a saturable reactor and a rectifier.

18. In a transformer, the combination comprising, a magnetic core, a first winding comprising a plurality of turns of conducting sheet material having a coating of insulation on at least one side generally spirally wound on said core, a second winding comprising a plurality of turns of conducting sheet material having a coating of insulation on at least one side, the turns of said second winding being wound with and continuously interleaved with a portion of the turns of said first winding to provide a predetermined capacitance between said first and second windings, and means responsive to the current in one of said windings when a potential is applied to one of said windings for varying the voltage applied to said capacitance with said current, said means being connected in circuit relation between one turn of the conducting sheet material of each of said first and second windings, said means comprising a reactance.

19. In a transformer, the combination comprising, a magnetic core, a first winding comprising a plurality of turns of conducting sheet material having a coating of insulation on at least one side generally spirally wound on said core, a second winding comprising a plurality of turns of conducting sheet material having a coating of insulation on at least one side, the turns of said second winding being wound with and continuously interleaved with a portion of the turns of said first winding to provide a predetermined capacitance between said first and second windings, and means responsive to the current in one of said windings when a potential is applied to one of said windings for varying the voltage applied to said capacitance with said current, said means being connected between one turn of the conducting sheet material of each of said windings, said means comprising a saturable reactor and a rectifier, said rectifier being connected in series with one of said windings, said saturable reactor having a load winding connected betwen the end turns of said windings and a control winding connected across the output of said rectifier.

20. A transformer comprising, a magnetic core, a first winding comprising a plurality of turns of conducting sheet material having a coating of insulation on at least one side, said turns being generally spirally wound on said core, a second winding comprising a plurality of turns of conducting sheet material having a coating of insulation on at least one side, the turns of said second winding being wound with and continuously interleaved with a portion of the turns of said first winding to provide a predetermined capacitance between said first and second windings, and means responsive to the current in one of said windings when a potential is applied to one of said windings for varying the voltage applied to said capacitance with said current, said means being connected in circuit relation between one turn of the conducting sheet material of said first winding and one turn of the conducting sheet material of said second winding, said means comprising a current transformer, said current transformer having an output winding connected between the end turns of said windings.

21. A transformer comprising a magnetic core, a first winding comprising a plurality of turns of conducting sheet material having a coating of insulation on at least one side, said turns being generally spirally wound on said core, a second winding comprising a plurality of turns of conducting sheet material having a coating of insulation on at least one side, the turns of said second winding starting and stopping at first and second predetermined turns of said first winding and being wound with and continuously interleaved with the adjacent turns of said first winding to provide a predetermined capacitance between said windings, and means responsive to the current in one of said windings when a potential is applied to one of said windings for varying the voltage applied to said capacitance with said current, said means being connected in circuit relation between one of the turns of the conducting sheet material of said first winding and one of the turns of conducting sheet material of said second winding.

22. In a transformer, the combination comprising, a magnetic core, a first winding comprising a plurality of turns of conducting sheet material having a coating of insulation on at least one side, said turns being generally spirally wound on said core, a second winding comprising a plurality of turns of conducting sheet material having a coating of insulation on at least one side, the turns of said second winding starting and stopping at first and second predetermined turns of said first winding and being wound with and continuously interleaved with the adjacent turns of said first winding to provide a predetermined capacitance between said windings, and means responsive to the current in one of said windings when a potential is applied to one of said windings for varying the voltage applied to said capacitance with said current, said means being connected in circuit relation between one of the turns of the conducting sheet material of said first winding and one of the turns of conducting sheet material of said second winding, said means comprising a current transformer having an output winding to provide an output voltage which varies with said current.

23. In a transformer, the combination comprising, a magnetic core, a first winding comprising a plurality of turns of conducting sheet material having a coating of insulation on at least one side generally spirally wound on said core, a second winding comprising a plurality of turns of conducting sheet material having a coating of insulation on at least one side, the turns of said second winding starting and stopping at first and second predetermined turns of said first winding and being wound with and continuously interleaved with the adjacent turns of said first winding to provide a predetermined capacitance between said windings, and means responsive to the current in one of said windings when a potential is applied to one of said windings for varying the voltage applied to said capacitance with said current, said means being connected in circuit relation between said first and second windings, said means comprising a saturable reactor and a rectifier.

24. In a transformer, the combination comprising, a magnetic core, a first winding comprising a plurality of turns of conducting sheet material having a coating of insulation on at least one side generally spirally wound on said core, a second winding comprising a plurality of turns of conducting sheet material having a coating of insulation on at least one side, the turns of said second winding starting and stopping at first and second predetermined turns of said first winding and being wound with and continuously interleaved with the adjacent turns of said first winding to provide a predetermined capacitance between said windings, and means responsive to the current in one of said windings when a potential is applied to one of said windings for varying the voltage applied to said capacitance with said current, said means being connected between said windings, said means comprising a saturable reactor and a rectifier, said rectifier being connected in series with one of said windings, said saturable reactor having a load winding connected between the end turns of said windings and a control winding connected across the output of said rectifier.

25. A transformer comprising, a magnetic core, a first winding comprising a plurality of turns of conducting sheet material having a coating of insulation on at least one side, said turns being generally spirally wound on said core, a second winding comprising a plurality of turns of conducting sheet material having a coating of insulation on at least one side, the turns of said second winding starting and stopping at first and second predetermined turns of said first winding and being wound with and continuously interleaved with the adjacent turns of said first winding to provide a predetermined capacitance between said windings, and means responsive to the current in one of said windings when a potential is applied to one of said windings for varying the voltage applied to said capacitance with said current, said means being connected in circuit relation between said first and second windings, said means comprising a current transformer, said current transformer having an output winding connected between the end turns of said windings to provide a voltage which varies with said current.

26. In a transformer, the combination comprising, a magnetic core, a first winding comprising a plurality of turns of conducting sheet material having a coating of insulation on at least one side generally spirally wound on said core, a second winding comprising a plurality of turns of conducting sheet material having a coating of insulation on at least one side, the turns of said second winding being wound with and continuously interleaved with a portion of the turns of said first winding to provide a predetermined capacitance between said first and second windings, one end turn of said first winding being adjacent to one end turn of said second winding, and means responsive to the current in one of said windings when a potential is applied to one of said windings for varying the voltage applied to said capacitance with said current, said means being connected in circuit relation between one turn of the conducting sheet material of each of said first and second windings.

References Cited by the Examiner

UNITED STATES PATENTS

| | | | |
|---|---|---|---|
| 1,399,968 | 12/21 | Knopp | 323—112 X |
| 2,521,513 | 9/50 | Gray | 336—223 |
| 2,688,117 | 8/54 | Knopp | 336—150 X |
| 2,874,359 | 2/59 | Christoffel et al. | 336—183 X |

LLOYD McCOLLUM, *Primary Examiner.*

ORIS L. RADER, MILTON O. HIRSHFIELD,
*Examiners.*